Sept. 27, 1927.
J. LEDWINKA
1,643,741
AUTOMOBILE BODY
Filed Oct. 7, 1921
3 Sheets-Sheet 1
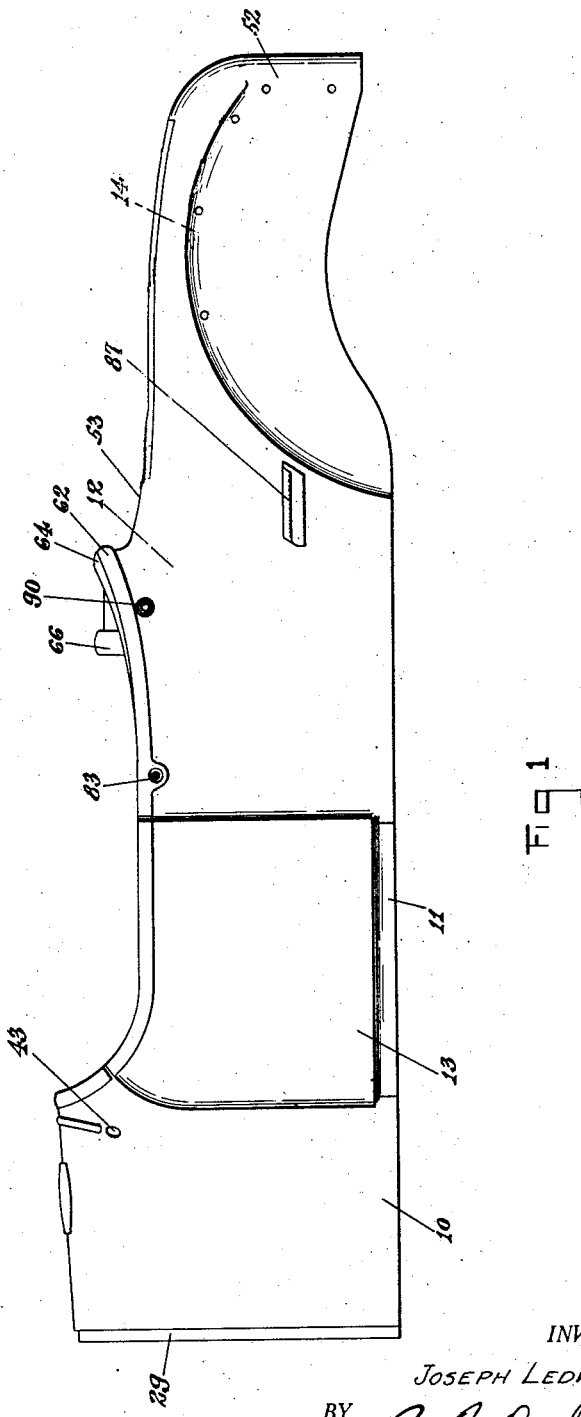
INVENTOR.
JOSEPH LEDWINKA.
BY
C. B. Desjardins
ATTORNEY.
Witness
Walter M. Trout.

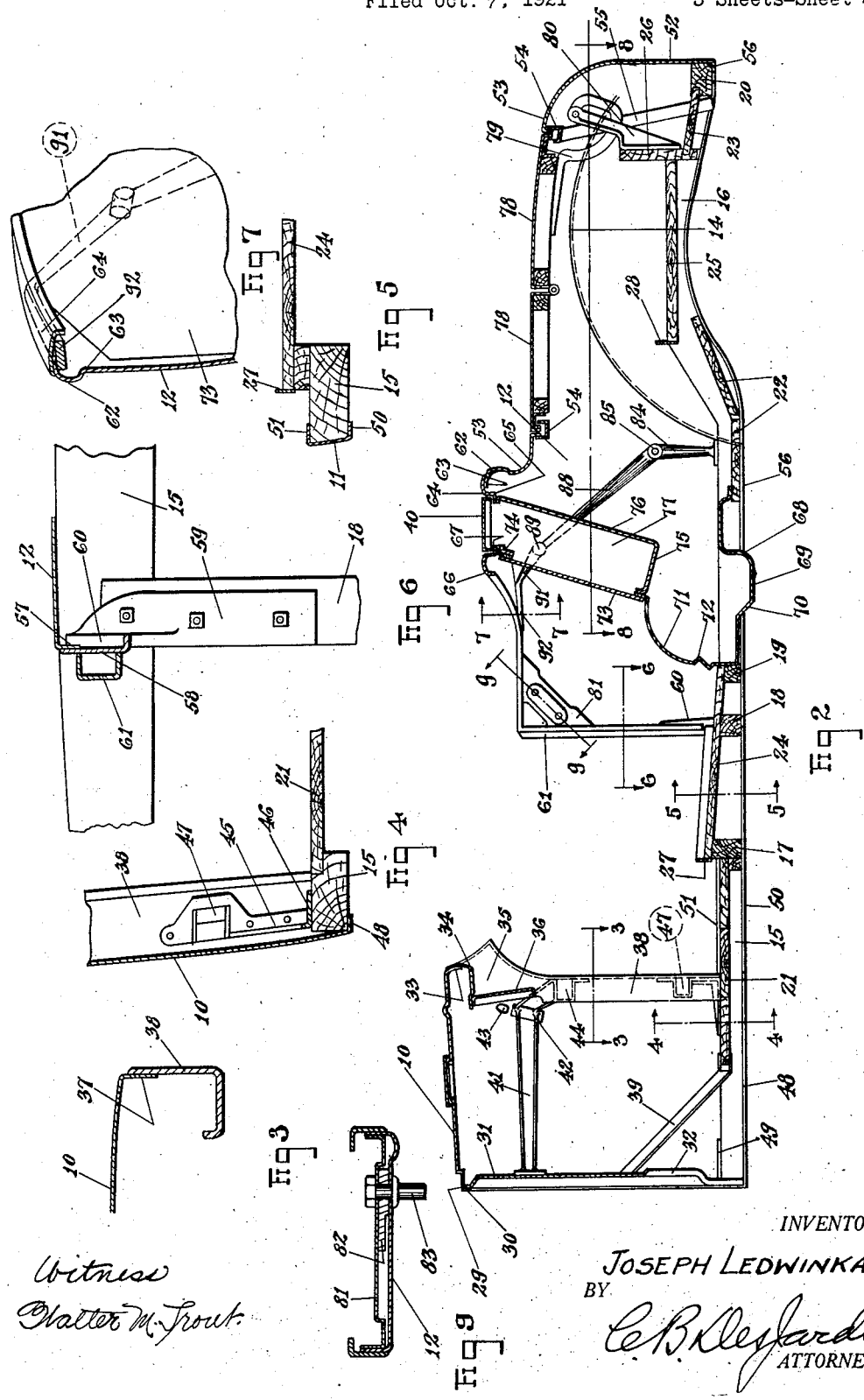

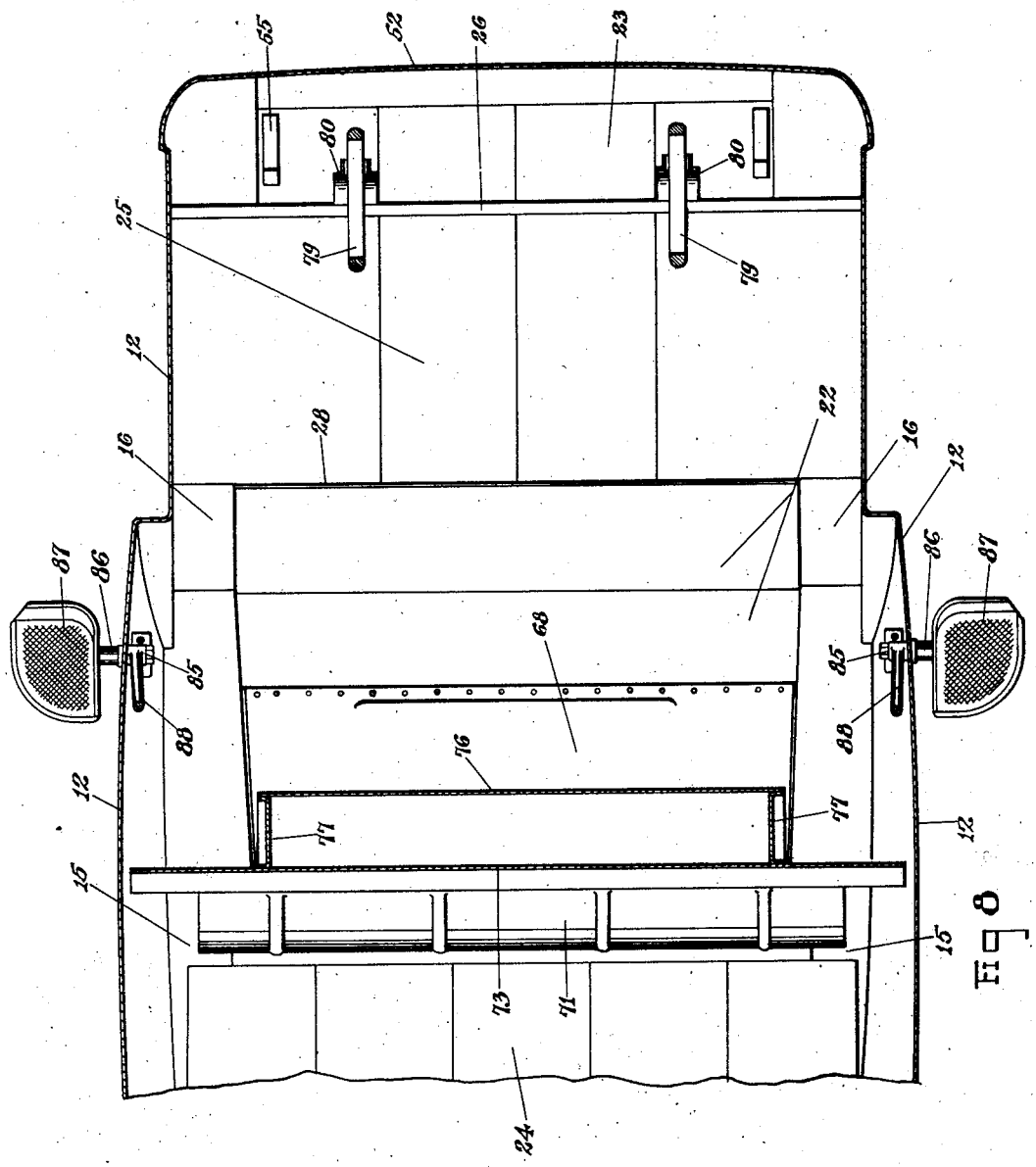

Patented Sept. 27, 1927.

1,643,741

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

AUTOMOBILE BODY.

Application filed October 7, 1921. Serial No. 506,121.

My invention relates to improvements in automobile bodies.

At the present time there are two types of bodies known, in the automobile body art, as the composite body and the all-metal body, respectively. The composite body comprises a wooden supporting framework including sills, seat supports and vertically-extending door posts to which the metal sheets, forming the body shell, are tacked. This form of body has certain advantages, particularly where the production is small, inasmuch as the cost of the necessary dies is comparatively low. The all-metal body, on the other hand, consists of a skeleton frame formed of metallic stampings integrally secured together and applied and integrally secured to curved sheet metal panels, forming the shell of the body, so as to reinforce the latter and tie them together. This type of body has many advantages over the composite type, particularly where large scale production is concerned, but the cost of the necessary dies is relatively large.

One of the objects of my present invention is to provide an automobile body structure which combines the low die cost of a composite body with many of the advantages of the all-metal body, in that the wooden framework is made very simple and all-metal body units are mounted upon this wooden framework to form the complete body.

Another object of my invention is to provide an automobile body comprising a wooden under-frame and a plurality of metal body units, including metal door posts, mounted on the wooden under-frame.

A further object of my invention is to provide an automobile body construction in which metal body units comprising body shell panels, reinforced by metallic stiffening members so as to be self-supporting and self-sustaining, are rigidly mounted on a wooden under-frame.

A further object of my invention is to provide an improved brace and top iron and step support for the body.

Further objects, and objects relating to details and economies of construction and operation, will definitely appear from the detailed description to follow. My invention is clearly defined and pointed out in the appended claims. A structure constituting a preferred embodiment of my invention is illustrated in the accompanying drawings, forming a part of this specification, in which:

Fig. 1 is a view in side elevation of a roadster body constructed in accordance with my invention.

Fig. 2 is a longitudinal, sectional view, taken in a vertical plane through said body.

Fig. 3 is a sectional view through a front door post, taken on the line 3—3 of Fig. 2.

Fig. 4 is a sectional view through one of the sills, taken on the line 4—4 of Fig. 2, and showing the connection of one of the front door posts to the sill.

Fig. 5 is a sectional view, taken on the line 5—5 of Fig. 2, through a portion of the support for the front seat.

Fig. 6 is a sectional view, taken on line 6—6 of Fig. 2, through a rear door post.

Fig. 7 is a sectional view through the upper edge of the rear panel, showing the connection of the bracing member thereto.

Fig. 8 is a sectional view, taken on the line 8—8 of Fig. 2, through the rear portion of the body, and Fig. 9 is a detail, sectional view, taken on the line 9—9 of Fig. 2, showing the front top iron support.

In the drawings, the same reference numerals refer to the same parts throughout the several views, and the sectional views are taken looking in the direction of the arrows at the ends of the section lines.

In general, my invention consists of an automobile body provided with a wooden under-frame, made up of longitudinally-extending body sills connected by suitable cross braces, and a plurality of all-metal body units rigidly mounted on this wooden under-frame. The wooden floor-boards and seat supports may be mounted on and constitute a part of this wooden under-frame. The all-metal body units will include a cowl unit, rigidly mounted on the forward end of the wooden under-frame, and comprising a cowl panel suitably reinforced so as to constitute a self-sustaining unit. This cowl unit may include vertically-extending stiffening bars secured to the rear vertical edges of the cowl panel and reinforcing the same, and constituting the front door posts. This body structure also includes one or more additional body units, so reinforced as to be self-sustaining, and rigidly secured to the wooden under-frame. In the accompanying drawings, I have illustrated a roadster body and the rear body unit includes a panel curved to form the sides and rear deck of the body and reinforced by suitable angle members secured to the forward and upper edges of the panel. This self-sustaining unit is rigidly mounted on the wooden under-frame. This unit may be further braced by bracing irons secured, at their lower ends, to the sills and, at their upper ends, to the upper edge of the panel. Such bracing irons afford a convenient means for mounting the top-irons and, also, outside steps by which one gains access to the emergency seat in the rear deck. In the case of a roadster body, such as illustrated, I may provide a cross partition of sheet metal, forming the back of the front seat, and suitable sheet metal stampings, forming a flooring and heel-board and supports for the toe-boards for the rear seat. I may also provide a suitable sheet-metal receptacle connected to the back of the front seat which may be used for storing the side curtains.

The roadster body which I have illustrated in the accompanying drawing, constitutes one embodiment of my invention but it is to be understood that I am not to be restricted to a roadster type of body nor to the specific details of this construction. This roadster body includes a cowl panel, 10, side panels, 11, and the rear deck panel, 12. The doors, 13, are mounted over the side panels and between the panels, 10 and 12. The rear deck panel, 12, is curved to form the sides and rear of the rear portion of the body and has the inwardly-pressed portions, 14, in the sides thereof, forming wheelhousings.

The wooden under-frame comprises the longitudinally-extending, wooden body-sills, 15, which extend upwardly, at 16, adjacent their rear ends, to provide a clearance for the rear axle of the vehicle. These body sills are connected at intervals by suitable wooden cross braces, 17, 18, 19 and 20. The wooden floor-boards, 21, 22 and 23, are supported by these body sills. A support, 24, for the front seat is also carried by the cross braces, 17, 18 and 19. The support, 25, for the rear seat is carried by the rear ends of the body sills. I also provide a cross member, 26, forming the rear wall of the rear seat. A strip, 27, attached to the forward and side edges of the seat support, 24, retains the seat cushion (not shown) in place. A similar strip, 28, is secured to the front edge of the seat support, 25.

The cowl unit is rigidly secured to the forward end of the wooden under-frame and comprises the cowl panel, 10, which is pressed into arch-shape to form the forward portion of the body. The forward edge of the cowl panel has a seat, 29, pressed therein, to receive the rear edge of the engine hood, the forward edge of said seat being provided with an inturned flange, 30, to which the margin of the shroud pan, 31, is rigidly secured. The lower portion of this shroud pan is cut out and provided with a marginal stiffening flange, 32. It will be seen that this shroud pan constitutes a reinforcement for the forward edge of the cowl panel. The rear upper edge of the cowl panel is flanged inwardly, at 33, and secured to the flange, 34, of the instrument-board support, 35, which extends transversely of the unit between the door posts and forms an integral part of such door posts. The instrument board, 36, is carried by this support, 35. The rear, vertical edges of the cowl panel, 10, are provided with the inturned flanges, 37, which are rigidly secured, by welding or otherwise, to the angle bars, 38, forming the front door posts. Brace members, 41, are interposed between the shroud pan, 31, and the respective door posts, 38, each of said braces being provided with a bearing, 42, to receive the lower end of a windshield stanchion (not shown). These stanchions extend out through the openings, 43, formed in the cowl panel. The rear end of the brace, 41, is formed into a box, 44, forming a mount for the upper hinge of the front door. The inclined angle members, 39, are secured at the sides of the cowl unit, as shown in Fig. 2. It will be seen that this cowl unit is constructed entirely of metal and is so reinforced and braced that it is entirely self-supporting. This unit is rigidly mounted on the forward ends of the wooden framework, being slipped thereover as shown in Fig. 2. The brackets, 45, shown in Fig. 4, are rigidly secured to the door posts, 38, and have the feet, 46, which are fastened to the wooden sills 15. The upper portion of each of the brackets, 45, is formed into a box, 47, forming a mount for the lower hinge of the front door. The side portions of the cowl panel, 10, have the inturned flanges, 48, at their lower edges, which lie under and are secured to the sills, 15. The bracket members, 49, are secured to and connect the forward ends of the sills and the shroud pan, 31. The lower ends of the inclined angle members, 39, are also secured to the body sills. These inclined angle members, 39, constitute supports for the toe-boards.

The side panels, 11, form coverings for the sides of the body sills beneath the door openings. These side panels have the lower flanges, 50, and the upper flanges, 51, which engage and are secured to the lower and upper faces, respectively, of the body sills.

The rear deck panel, 12, as I have stated, is curved to the desired contour to form the sides, rear and top portion of the rear end of the body. In the case of a roadster type of body this panel has the back wall, 52, and the top wall, 53, forming the rear deck. An opening is provided in this top wall, 53, giving access to the rear seat mounted on the support, 25. This opening is surrounded with a marginal flange to which is secured the channel-shaped drip trough, 54, to which is connected the tube, 55, by means of which any water collecting in the channel, 54, will be drained off. This panel, 12, is provided with an inturned flange, 56, at its lower edge, which flange is secured to the lower faces of the body sills, 15, and cross brace, 20. The forward, vertical edges of the panel, 12, are reinforced by the rear door posts. These door posts comprise the angle-bars, 58, which are rigidly secured, by welding or otherwise, to the inturned flanges, 57, of the panel, 12. This body unit is connected to the wooden under-frame at this point by means of the brackets, 59, rigidly secured to sills, 15, and cross braces, 18, and provided with upwardly-extending arms, 60, secured to the door posts, 58. A channel member, 61, may be secured to the outer face of the door post, 58, constituting a rabbet strip and forming a stop for the free edge of the door, 13. At the upper edge of the panel, 12, it is stiffened by the formation of the bead, 62, following and conforming to the curvature of said upper edge, and an inturned flange, 63. This structure is further reinforced by a curved angle member, 64, rigidly secured, by welding or otherwise, to the flange, 63. The upper side portions of the panel, 12, are also connected and reinforced by a channel member, 66, which extends transversely from one side of the body to the other, with its central portion spaced from the angle member, 64, and its ends merging into and rigidly secured to said angle member.

The stamping, 68, is carried by the body sills, 15, and constitutes a part of the floor of the body. This stamping has a recess, 69, formed therein, with an inclined wall, 70. Another metal stamping, 71, is secured at its lower edge to the cross brace, 19, and extends upwardly therefrom, forming a part of the back wall of the front seat. This stamping has an inclined surface, 72. The depression, 69, furnishes a recess for receiving the heels of the occupant of the rear seat, and the surfaces, 70 and 72, are in line with each other and support the toeboard (not shown) for the rear seat. A sheet-metal panel, 73, extends across from one side wall of the panel, 12, to the other, forming the back of the front seat. The lower edge of this panel, 73, is secured to the upper edge of the stamping, 71, or these two stampings might be made in one, if desired. The upper edge of the panel, 73, is secured to the channel member, 66. A sheet-metal stamping, 76, is provided with a lower flange, 75, secured to the lower portion of the panel, 73. The upper edge of the stamping, 76, is rigidly secured to the angle member, 64. The end panels, 77, are secured in place between the stampings, 73 and 76, as shown in Fig. 8, so that these various parts form a compartment or cabinet, in which the side curtains may be stored. The channel member, 66, is provided with a ledge, 67, and the angle member, 64, with a ledge, 65, to receive the cover, 40, closing this compartment.

The opening in the top wall, 53, of the rear deck is covered by the closure comprising the two sections, 78, hinged together and carried by the hinges, 79, pivoted on the brackets, 80, secured to the cross member, 26, at the rear of the seat support, 25. This feature is not claimed herein, having been disclosed and claimed in a prior application by me, now pending, Serial No. 336,057, filed Nov. 6th, 1919.

Sheet metal straps, 81, are applied to the forward, upper corners of the panel, 12, as shown in Figs. 2 and 9, these straps being secured at their ends to the angle member, 64, and the door posts, 58, respectively. A block, 82, is interposed between the panel, 12, and the strap, 81, and the shank of the top-iron, 83, passes through registering openings in the panel, the block and the strap. This body unit is further braced by bracing irons each including the lower, vertically-extending portion, 84, secured rigidly at its lower end to the body sill, 15. At the upper end of this vertically-extending portion, 84, there is a boss, 85, which receives the shank, 86, of a step, 87. This step, 87, is on the outside of the body and the shank, 86, extends through an opening in the panel, 12, and a registering opening in the boss, 85, and is securely clamped to the latter. From the boss, 85, the bracing iron has a portion, 88, extending forwardly and upwardly to the boss, 89, which receives the shank of a top-iron, 90, extending through the side of the panel, 12, and through a registering opening in the boss, 89, and securely clamped thereto. The bracing iron also has the upper portion, 91, extending from boss, 89, forwardly and upwardly to the upper edge of the panel and terminating in the bar, 92, rigidly secured in the channel formed by the flange, 63, and the angle member, 64.

It will be seen that this body comprises, in this case, a pair of self-sustaining and self-supporting body units constructed entirely of metal and mounted upon the wooden under-frame. I have already pointed out the manner in which the cowl unit is braced, to make it self-supporting, and connected to the wooden under-frame. The rear unit is braced and reinforced by the metal door posts, 58, the reinforcing construction at the upper edge of the panel, 12, and the transverse channel member, 66. All of these features, together with the transverse stampings forming the back of the front seat, reinforce and stiffen the panel, 12, so as to make it self-supporting. The straps, 81, act like gussets for the forward, upper corners of the panel, 12, and also provide an excellent support for the top iron. The transverse channel member, 66, not only stiffens the structure but provides a channel to receive the upper edge of detachable upholstery units. The bracing irons, comprising the portions, 84, 88 and 91, also reinforce this rear body unit and provide adequate support for the steps, 87, and the top irons, 90. This rear body unit is connected to the wooden under-frame by means of the lower flange, 56, on the panel, 12, the brackets, 59, and the bracing irons, having the portions, 84, connected to the sills.

I am aware that the particular body construction, which I have illustrated, may be changed considerably without departing from the spirit of my invention and, therefore, I wish to claim my invention broadly, as indicated by the appended claims.

Having thus described my invention, what I claim as new and desire to secure by Letters Patent is:—

1. A body structure for automobiles comprising an under-frame including longitudinally-extending body sills connected by suitable cross braces, a rear panel curved to form the sides and rear deck of the body and mounted on said under-frame, metal angle members integrally secured to the forward edges of said panel to form door posts, a curved angle member rigidly secured to the upper edge of said panel, a second angle member extending transversely of said body and integrally secured at its ends to the upper, side portions of said panel, and means for rigidly fastening said door posts to the under-frame.

2. A body structure for automobiles comprising an under-frame including longitudinally-extending body sills connected by suitable cross braces, a rear panel curved to form the sides and rear deck of the body and mounted on said under-frame, metal angle members integrally secured to the forward edges of said panel to form door posts, a curved angle-member rigidly secured to the upper edge of said panel, a second angle member extending transversely of said body and integrally secured at its ends to the upper, side portions of said panel, a transverse seat-back panel secured at its upper edge to said second angle member, and means for rigidly fastening said door posts to the under-frame.

3. A body structure for automobiles comprising a wooden under-frame including longitudinally-extending body sills connected by suitable cross braces, a rear panel curved to form the sides and rear deck of the body and mounted on said under-frame, metal angle members integrally secured to the forward edges of said panel to form door posts, a curved angle member rigidly secured to the upper edge of said panel, a second angle member extending transversely of said body and integrally secured at its ends to the upper, side portions of said panel, a transverse, seat-back panel secured at its upper edge to said second angle member, the central portion of said second angle member being spaced from the central portion of said first angle member, a stamping secured to said seat-back panel and said first angle member to form a compartment behind the front seat, and means for rigidly fastening said door posts to the under-frame.

4. A body structure for automobiles comprising an under-frame including longitudinally-extending body sills connected by suitable cross braces, a rear panel curved to form the sides and rear deck of the body and mounted on said under-frame, metal angle bars integrally secured to the forward edges of said panel to form door posts, a curved angle member rigidly secured to the upper edge of said panel, a second angle member extending transversely of said body and integrally secured at its ends to the upper, side portions of said panel, a transversely-extending seat-back panel secured at its upper edge to said second angle member, a metal floor panel carried by said under-frame and provided with a heel-receiving recess, and means for rigidly fastening said door posts to the under-frame.

5. A body structure for automobiles, comprising an under frame including longitudinally-extending body sills connected by suitable cross braces, a rear panel curved to form the sides and rear deck of the body and mounted on said under-frame, metal angle bars integrally secured to the forward edges of said panel to form door posts, a transverse seat-back panel, a metal floor panel carried by said under-frame and provided with a heel-receiving recess, a stamping extending upwardly from said floor panel to said seat-back panel, said stamping and floor panel being provided with aligned, inclined surfaces to support a toe-board, and means for rigidly fastening said door posts to the under-frame.

6. In a body structure for automobiles, the combination with a sheet metal panel curved to form the sides and rear of the body, a metal reinforcing member secured to a front, vertical edge of said panel and a metal reinforcing member secured to the upper edge of said panel, of a strap applied to the inner surface of said panel and extending across a corner thereof, the ends of said strap being secured to said reinforcing members, said panel and strap being provided with registering openings adapted to receive the shank of a top-iron.

7. In a body structure for automobiles, the combination with a panel curved to form the sides and rear of the body, a metal reinforcing member secured to the front, vertical edge of said panel and a metal reinforcing member secured to the upper edge of said panel, of a strap applied to the inner surface of said panel and extending across a corner thereof, the ends of said strap being secured to said reinforcing members, a block interposed between said panel and said strap, said panel, strap and block being provided with registering openings adapted to receive the shank of a top-iron.

8. A body structure for automobiles comprising an under-frame including longitudinally-extending body sills, a sheet metal panel curved to form the sides and rear of the body and secured to said under-frame sills, an angle member integrally secured to the upper edge of said panel, and a bracing iron positioned adjacent an inner surface of said panel, and fastened, at its lower end, to a sill and, at its upper end, to said angle member, said bracing having means to receive and support a top iron.

9. A body structure for automobiles comprising an under-frame including longitudinally-extending body sills, a sheet metal panel curved to form the sides and rear of the body and mounted on said under-frame, an angle member integrally secured to the upper edge of said panel, and a bracing iron positioned adjacent an inner surface of said panel and fastened, at its lower end, to a sill and, at its upper end, to said angle member, said bracing iron being provided with an opening registering with an opening in said panel and adapted to receive the shank of a top-iron.

10. A body structure for automobiles comprising an under-frame including longitudinally extending body sills, a sheet metal panel curved to form the sides and rear of the body and mounted on said under-frame, an angle member integrally secured to the upper edge of said panel, a bracing iron positioned adjacent an inner surface of said panel and fastened, at its lower end, to a sill and, at its upper end, to said angle member, said bracing iron being provided with an opening registering with an opening in said panel, and a step having a shank extending through said opening and secured to said bracing iron.

11. A body structure for automobiles comprising an underframe including longitudinally-extending body sills, a sheet metal panel curved to form the sides and rear of the body and mounted on said under-frame, an angle member integrally secured to the upper edge of said panel, a bracing iron positioned adjacent an inner surface of said panel and fastened, at its lower end, to a sill and, at its upper end, to said angle member, said bracing iron being provided with an opening registering with an opening in said panel, a step having a shank extending through said openings and secured to said bracing iron, said bracing iron having a second opening registering with an opening in said panel, and a top-iron having a shank passing through said last-named openings.

12. In a body structure for automobiles, the combination with a sheet metal panel curved to form the sides and rear of the body, and having vertically and horizontally disposed edge portions, of a strap member applied to the inner surface of said panel and connected at its ends respectively to said vertical and horizontal panel edge portions, said panel and strap constructed to receive the shank of a top iron.

13. In a body structure for automobiles, the combination with a sheet metal panel curved to form the sides and rear of the body, a wooden underframe supporting structure therefor, including longitudinally-extending side sills and cross connecting braces, the upper edge of said panel having an inwardly-extending reinforcing member integrally connected thereto, and a bracing iron connected at its lower end to a side sill of the under-frame and extending upwardly and forwardly therefrom adjacent a side portion of said panel, and connected at its upper end to said member.

In testimony whereof, I affix my signature.

JOSEPH LEDWINKA.